(12) United States Patent
Nakamura

(10) Patent No.: US 7,792,605 B2
(45) Date of Patent: Sep. 7, 2010

(54) NUMERICAL CONTROL APPARATUS

(75) Inventor: Naoki Nakamura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 564 days.

(21) Appl. No.: 11/791,217

(22) PCT Filed: Jul. 26, 2006

(86) PCT No.: PCT/JP2006/314805

§ 371 (c)(1),
(2), (4) Date: May 22, 2007

(87) PCT Pub. No.: WO2008/012884

PCT Pub. Date: Jan. 31, 2008

(65) Prior Publication Data

US 2009/0228135 A1    Sep. 10, 2009

(51) Int. Cl.
*G06F 19/00* (2006.01)
(52) U.S. Cl. .................... 700/188; 700/89; 700/159; 700/160; 700/181; 700/185
(58) Field of Classification Search .................... 700/89, 700/159–160, 175, 181, 185, 188
See application file for complete search history.

(56) References Cited

U.S. PATENT DOCUMENTS

| | | | |
|---|---|---|---|
| 3,508,251 A * | 4/1970 | Kelling | 341/113 |
| 4,477,754 A * | 10/1984 | Roch et al. | 318/568.1 |
| 4,510,565 A * | 4/1985 | Dummermuth | 700/7 |
| 4,698,773 A * | 10/1987 | Jeppsson | 700/160 |
| 5,400,260 A * | 3/1995 | Matsumura et al. | 700/180 |
| 5,453,674 A * | 9/1995 | Seki et al. | 318/573 |
| 5,594,908 A * | 1/1997 | Hyatt | 710/67 |
| 6,225,772 B1 * | 5/2001 | Aizawa et al. | 318/571 |
| 6,317,646 B1 * | 11/2001 | de Caussin et al. | 700/173 |

FOREIGN PATENT DOCUMENTS

| | | |
|---|---|---|
| JP | 58-82650 A | 5/1983 |
| JP | SHO60-207910 A | 10/1985 |
| JP | SHO63-047805 A | 2/1988 |
| JP | 64-87133 A | 3/1989 |
| JP | 5-388 A | 1/1993 |
| JP | HE15-189020 A | 7/1993 |
| JP | 6-226587 A | 8/1994 |
| TW | 556066 B | 10/2003 |

\* cited by examiner

*Primary Examiner*—Ramesh B Patel
(74) *Attorney, Agent, or Firm*—Sughrue Mion, PLLC

(57) ABSTRACT

In a numerical control apparatus, a machining-condition storage device stores in a storage device machining conditions including a tool number, servo-axis feed speed, and the number of main-axis rotations, and override values of a servo axis and a main axis specified through an override switch. A machining-condition checking unit monitors whether a combination of machining conditions that matches machining conditions specified in a machining block to be executed is present in the storage device, and, if any, outputs a signal. An interpolation processor multiplies, based on the signal output from the machining-condition checking unit servo-axis feed speed and the number of main-axis rotations specified in the machining block by the override values stored in the storage device.

18 Claims, 4 Drawing Sheets

NUMERICAL CONTROL APPARATUS

TECHNICAL FIELD

The present invention relates to a numerical control apparatus (hereinafter, NC apparatus), and, more particularly to a method of controlling override of a servo axis, and a main axis of the NC apparatus.

BACKGROUND ART

In override control of an NC apparatus, in general, when a dial (knob) of an override switch provided on a console panel is turned, a feed speed (cutting speed) of a servo axis specified in a machining program is changed at a percentage indicated by a scale of the dial. In general, a fast-forward override and a main axis override can be also set in a similar manner.

According to override control of conventional NC apparatuses, an editing operation of writing an override value in the block in execution can be performed, by inputting an override value from the outside during the execution of the machining program. Thereafter, in executing the same machining program, override is controlled in advance to work at a speed edited by the machining program (for example, see Patent Document 1).

When an override is input during the execution of a machining program, a program number and an override value of the program in execution are stored as a set. At the time of executing the same machining program next time, an override value corresponding to the block number of the program in execution is used from among stored override values, thereby carrying out the operation at the same speed (for example, see Patent Documents 2 and 3).

Patent Document 1: Japanese Patent Application Laid-open No. S63-47805 (Page 1, FIG. 2, FIG. 3)

Patent Document 2: Japanese Patent Application Laid-open No. H05-189020 (Page 1, FIG. 6)

Patent Document 3: Japanese Patent Application Laid-open No. S60-207910 (Page 1)

DISCLOSURE OF INVENTION

Problem to be Solved by the Invention

However, according to the override control of the conventional NC apparatus, the machining program needs to be executed in two modes including a storage mode of storing an override value and an execution mode of actually executing the machining, for each block number of the machining program to be executed.

Moreover, a plurality of blocks to be machined in the same machining condition are occasionally present in the machining program. It is troublesome for an operator to change the override value each time in the storage mode, and therefore improvements of this method has been required.

The present invention has been achieved in view of the above problems, and it is an object of the invention to provide a numerical control apparatus, in which override is automatically controlled after a change of an override value at any point in a machining program so that a servo-axis feed-speed instruction value and a main-axis rotation-number instruction value of another machining block within the same machining program can be easily controlled, which is capable of completing machining in one-time execution without executing the machining program two times in storage mode and execution mode, and completing in a short time the execution of the machining program that takes a long machining time.

Means for Solving Problem

To solve the problems mentioned above, according to an aspect of the present invention, a numerical control apparatus that performs machining of a workpiece according to a machining program and variably controls speed of a servo axis and a main axis based on an override value specified through an override switch, includes a machining-condition storage unit that stores, in a storage device, machining conditions including at least a tool number, a servo-axis feed-speed instruction value, and a main-axis rotation-number instruction value specified by the machining program, and an override value of the servo axis and an override value of the main axis specified through the override switch in association with the machining conditions, a machining-condition monitoring unit that monitors whether a combination of machining conditions that matches machining conditions specified in a machining block is stored in the storage device, and a control unit that multiplies each of the servo-axis feed-speed instruction value and the main-axis rotation-number instruction value to be executed by an override value associated with the machining conditions stored in the storage device when a combination of machining conditions that matches the machining conditions specified is stored based on a monitoring result obtained by the machining-condition monitoring unit.

According to another aspect of the present invention, a numerical control apparatus that performs machining of a workpiece according to a machining program and variably controls speed of a servo axis and a main axis based on an override value specified through an override switch, includes a machining-condition storage unit that stores, in a storage device, machining conditions including at least a tool number, a servo-axis feed-speed instruction value, and a main-axis rotation-number instruction value specified by the machining program, and an override value of the servo axis and an override value of the main axis specified through the override switch in association with the machining conditions, a machining-condition monitoring unit that monitors whether a combination of machining conditions that matches machining conditions specified in a machining block is stored in the storage device, and a control unit that, when the machining-condition monitoring unit determines that a combination of machining conditions that matches the machining conditions specified is stored, controls the speed of the servo axis and the main axis with feed speed and number of main-axis rotations each multiplied by a corresponding override value and a current override value when override multiplication is valid based on an override multiplication valid/invalid signal set in advance, and controls the speed of the servo axis and the main axis with feed speed and number of main-axis rotations each multiplied only by a corresponding override value when override multiplication is invalid.

According to still another aspect of the present invention, a numerical control apparatus that performs machining of a workpiece according to a machining program and variably controls speed of a servo axis and a main axis based on an override value specified through an override switch, includes a machining-condition storage unit that stores a main-axis load current during machining in a storage device, a load-current checking unit that compares a currently specified main-axis load current with the main-axis load current stored in the storage device, and a control unit that, based on a comparison result obtained by the load-current checking unit, decreases an override value of the servo axis at a change rate set in advance when the currently specified main-axis load current is larger than the main-axis load current stored in the storage device, and increases the override value of the servo axis at the change rate set in advance when the currently specified main-axis load current is smaller than the main-axis load current stored in the storage device, so that the currently specified main-axis load current is coincide with stored main-axis load current.

Effect of the Invention

In the numerical control apparatus according to the present invention, a machining condition irrelevant to a machining program number and a block number, and an override value corresponding to the machining condition are stored, and the machining condition is checked. With this arrangement, override values of a servo axis and a main axis can be controlled. Therefore, a feed speed instruction of a servo axis and a main-axis rotation-number instruction value of other machining program within one machining program group and other machining block within the same machining program can be easily controlled. This decreases the labor of an override operation by an operator.

A machining program does not need to be executed at two times in the storage mode and the execution mode, and the machining can be completed at one time. Even when a machining program has a long machining time, this machining program can be ended in a short time.

Figure 1:
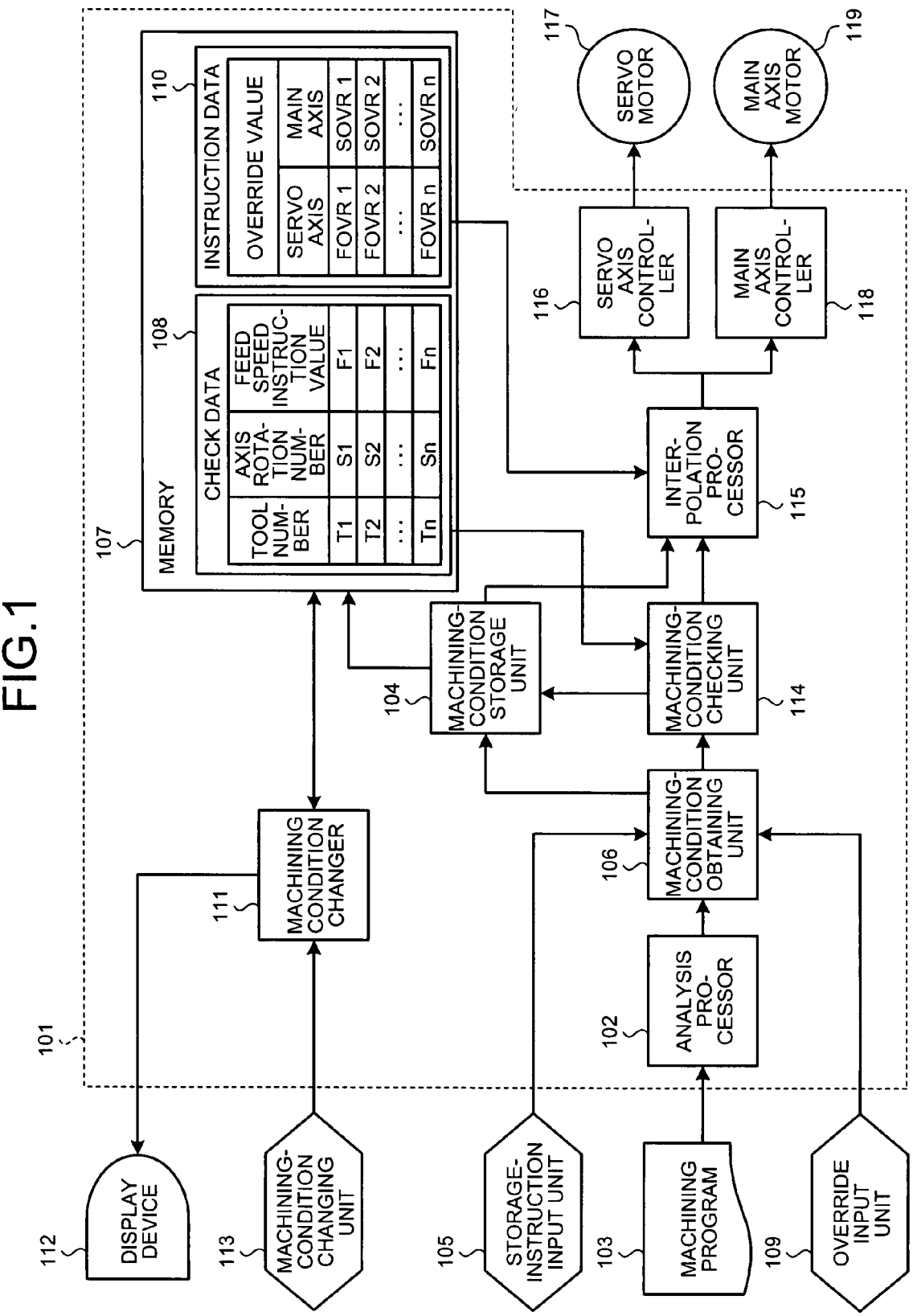
FIG. 1 is a block diagram of a numerical control apparatus according to a first embodiment of the present invention.

EXPLANATIONS OF LETTERS OR NUMERALS 101, 201 NC apparatus
102, 202 Analysis processor
103, 203 Machining program
104 Machining-condition storage unit
105, 206 Storage-instruction input unit
106, 204 Machining-condition obtaining unit
107, 207 Memory (storage unit)
108 Check data area in memory
109 Override input unit
110 Instruction data area in memory
111, 208 Machining condition changer
112, 209 Display device
113, 210 Machining-condition changing unit
114 Machining-condition checking unit (Machining-condition monitoring unit)
115, 213 Interpolation processor (Controller)
116, 214 Servo axis controller
117, 215 Servo motor
118, 216 Main axis controller
119, 217 Main axis motor
211 Load-current checking unit
212 Override input unit

BEST MODE(S) FOR CARRYING OUT THE INVENTION

Exemplary embodiments of a numerical control apparatus according to the present invention are explained below in detail with reference to the accompanying drawings. The invention is not limited to the embodiments.

First Embodiment

A numerical control apparatus according to a first embodiment of the present invention stores therein, in response to a storage instruction, machining conditions such as a tool number, a servo-axis feed-speed instruction value, and a main-axis rotation-number instruction value together with override values of the servo axis and the main axis specified by a machining program. Accordingly, when machining is performed thereafter under the same machining conditions, the stored override values can be used.

FIG. 1 is a block diagram of the numerical control apparatus according to the first embodiment of the present invention. In FIG. 1, a numerical control apparatus 101 includes an analysis processor 102, a machining-condition storage unit 104, a machining-condition obtaining unit 106, a memory 107 as a storage unit, a machining condition changer 111, a machining-condition checking unit 114 as a machining-condition monitoring unit, an interpolation processor 115 as a controller, a servo axis controller 116, and a main axis controller 118.

The analysis processor 102 reads machining blocks of a machining program 103 input from the outside on a block by block basis. The machining-condition obtaining unit 106 obtains (extracts) machining conditions including a tool number, a servo-axis feed-speed instruction value, and a main-axis rotation-number instruction value from the read machining program with respect to each machining block.

When a storage instruction that has been output in sequence process, etc. by a PLC (Programmable Logic Controller) is input to a storage-instruction input unit 105, it is determined that the numerical control apparatus is in storage mode, described later. Then, the machining-condition storage unit 104 stores, in a check data area in the memory 107, the tool number, the servo-axis feed-speed instruction value, and the main-axis rotation-number instruction value obtained (extracted) by the machining-condition obtaining unit 106. The machining-condition storage unit 104 also stores the override values of the servo axis and the main axis set through an override input unit 109 in an instruction data area 110 in the memory 107.

The machining condition changer 111 displays the machining conditions and the override values stored in the memory 107 on a display device 112 such as a CRT. The machining condition changer 111 enables changes in or addition to the machining conditions and the override values stored in the memory 107 based on operation input provided through a machining-condition changing unit 113 such as a console panel.

The machining-condition checking unit 114 compares the tool number, the servo-axis feed-speed instruction value, and the main-axis rotation-number instruction value specified by the machining program 103 with the tool number, the servo-axis feed-speed instruction value, and the main-axis rotation-number instruction value stored in the check data area 108 in the memory 107.

When there is a machining condition that matches the one stored in the instruction data area 110 as a result of the check by the machining-condition checking unit 114, the interpolation processor 115 reads the override values of the servo axis and the main axis stored in the instruction data area 110 in the memory 107, and determines a servo-axis moving instruction and a main-axis rotation number instruction from the read override value.

The servo axis controller 116 outputs driving power for achieving the determined servo-axis moving instruction to a servo motor 117. Meanwhile, the main axis controller 118 outputs driving power for achieving the determined main-axis rotation number instruction to a main axis motor 119.

Figure 2:
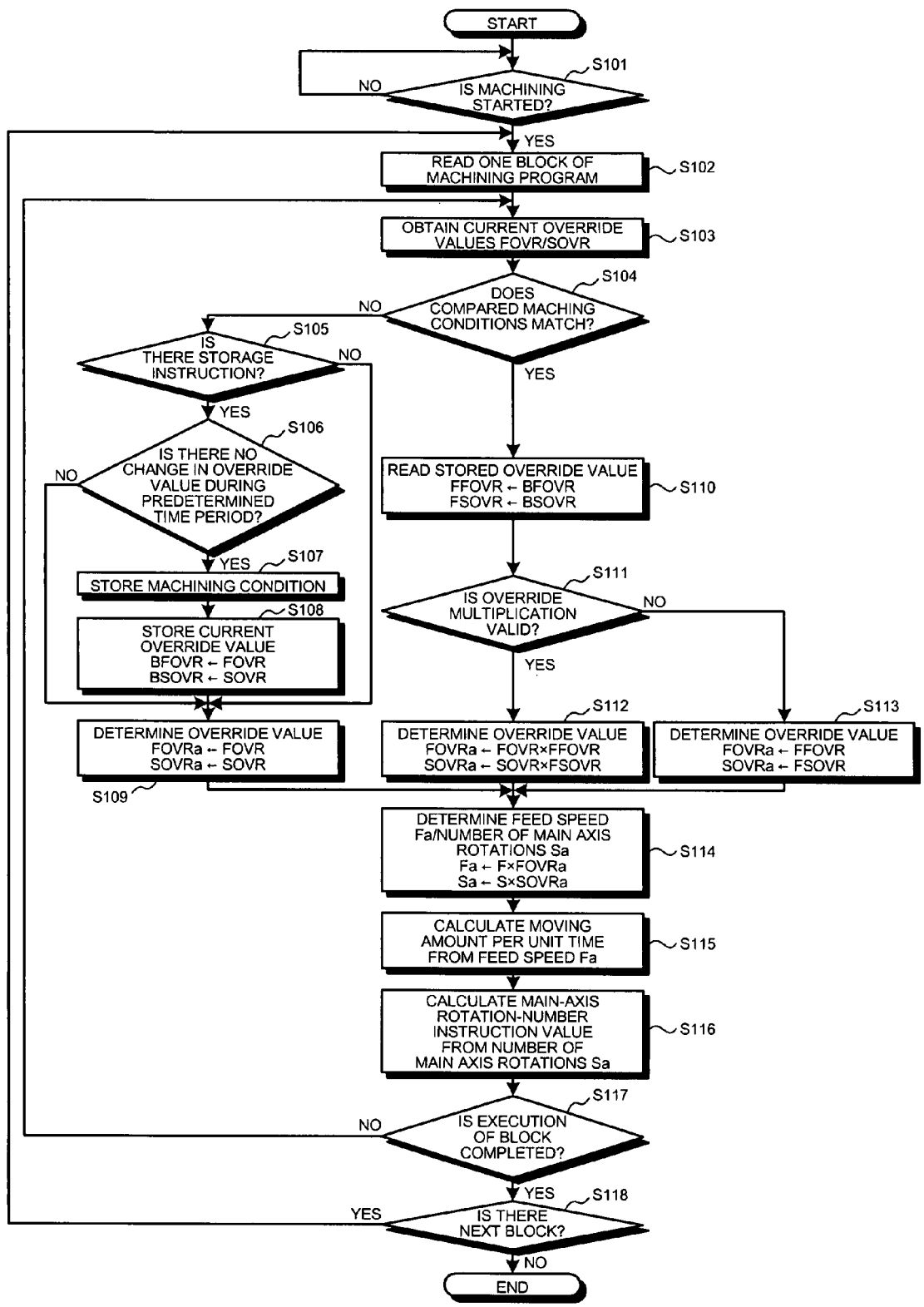
FIG. 2 is a flowchart of a process procedure performed by the numerical control apparatus according to the first embodiment of the present invention.

FIG. 2 is a flowchart of a process procedure performed by the numerical control apparatus 101 according to this embodiment. The process procedure is explained in detail below with reference to FIG. 2. A starting button (not shown) is pressed, and machining is started (YES at step S101). In a first loop, the analysis processor 102 reads each machining block of the machining program 103 (step S102). This first loop is repeated until there is no machining block of the machining program 103 left (step S118). During this period, the process at step S103 to step S117 is repeated.

The process control proceeds to step S103, and in a second loop, first, the machining-condition obtaining unit 106 obtains (extracts) a current override value FOVR of the servo axis and an override value SOVR of the main axis set through the override input unit 109 (step SS103).

The machining-condition storage unit 104 then compares the machining conditions including the tool number, the servo-axis feed-speed instruction value, and the main-axis rotation-number instruction value specified by the machining program with the check data 108 in the memory 107, thereby searching a machining condition that matches the one in the check data 108. When there is such a machining condition, i.e., when it is determined that the compared machining conditions match, the machining-condition storage unit 104 switches the current mode to the execution mode of executing the machining using the stored override value. On the other hand, when there is no such machining condition, i.e., when it is determined that the compared machining conditions does not match, the machining-condition storage unit 104 switches the current mode to the storage mode of storing the override value (step S104).

When the mode is switched to the storage mode, process at step S105 to step S109 is performed, and the override value is stored in the memory 107. On the other hand, when the execution mode is selected, process at step S110 to step S113 is performed, and an override value to be applied is adjusted. In other words, the override value to be applied is adjusted based on the stored override value. The process in the storage mode at step S105 to step S109 and the process in the execution mode at step S110 to step S113 are described later. Either the process in the storage mode or the process in the execution mode is performed, and a speed override value FOVRa of the servo axis and a speed override value SOVRa of the main axis to be applied are determined.

The process control then proceeds to step S114, and the determined override value is multiplied by a servo-axis feed-speed instruction value F (F instruction in the machining program) and a main-axis rotation-number instruction value S (S instruction in the machining program) specified by the machining program to determine feed speed Fa of the servo axis and the number of main-axis rotations Sa after the adjustment (step S114). The feed speed Fa of the servo axis and the number of main-axis rotations Sa are determined by the following expression 1 and expression 2.

$$Fa = F \times FOVRa \quad \text{(Expression 1)}$$

$$Sa = S \times SOVRa \quad \text{(Expression 2)}$$

Fa: Feed speed after adjustment

Sa: Number of main-axis rotations after adjustment

F: Feed speed instruction value specified by machining program

S: Main-axis rotation-number instruction value specified by machining program

A servo-axis moving amount per unit control time is then calculated from the determined feed speed Fa. The servo axis controller 116 drives the servo motor 117 (step S115). A main-axis rotation-number instruction value is calculated from the number of main-axis rotations Sa, and the main axis controller 118 drives the main axis motor 119 (step S116). The second loop of this process procedure is repeated until the execution of one block is completed (step S117).

A method and a process procedure of determining the speed override value FOVRa of the servo axis and the speed override value SOVRa of the main axis in the storage mode (the process at step S105 to step S109) are explained next in detail.

When there is no matching machining condition as a result of checking the machining conditions and it is determined that the mode is the storage mode, it is determined whether a storage instruction has been input through the storage-instruction input unit 105 as a G instruction or a PLC signal in the machining program (step S105).

When a storage instruction has been input, it is monitored whether an operator operates to change the current servo-axis override value FOVR and the main-axis override value SOVR (step S106). When the override value is not changed during a predetermined time, the machining-condition storage unit 104 stores the machining conditions including the tool number, the servo-axis feed-speed instruction value, and the main-axis rotation-number instruction value in the check data area 108 (step S107). The machining-condition storage unit 104 stores the current servo-axis override value FOVR and the main-axis override value SOVR in the instruction data area 110 in the memory 107 based on the expression 3 and the expression 4 (step S108).

$$BFOVR(i) = FOVR \quad \text{(Expression 3)}$$

$$BSOVR(i) = SOVR \quad \text{(Expression 4)}$$

BFOVR(i): Servo-axis override value stored according to storage instruction

SFOVR(i): Main-axis override value stored according to storage instruction

In this case, when the same machining condition has already been stored, the machining condition is not newly stored, and the corresponding override value is overwritten.

On the other hand, when a storage instruction has not been input through the storage-instruction input unit 105 as the G instruction or the PLC signal of the machining program, the override value specified in the machining program is directly used as the speed override values of the servo axis and the main axis as shown in the following expression 5 and the expression 6 (step S109).

$$FOVRa = FOVR \quad \text{(Expression 5)}$$

$$SOVRa = SOVR \quad \text{(Expression 6)}$$

The speed override value FOVRa of the servo axis and the speed override value SOVRa of the main axis in the storage mode are determined in the above manner.

A method and a process procedure of determining the speed override value FOVRa of the servo axis and the speed override value SOVRa of the main axis in the execution mode (the process at step S110 to step S113) are explained in detail next.

When a matching machining condition is found as a result of checking the machining conditions and the mode is determined as the execution mode, an override value corresponding to the machining condition is read as shown in the expression 7 and the expression 8 (step S110).

$$FFOVR=BFOVR(i) \quad \text{(Expression 7)}$$

$$FSOVR=BSOVR(i) \quad \text{(Expression 8)}$$

FFOVR: Feed-speed override value of servo axis with matching machining condition FSOVR: Feed-speed override value of main axis with matching machining condition It is checked whether override multiplication is valid in presettings (step S111). When the override multiplication is valid, values obtained by multiplying the override values FFOVR/FSOVR read from the instruction data area 110 in the memory 107 by the currently specified override values are used as override values to be applied as shown in the expression 9 and the expression 10 (step S112).

$$FOVRa=FFOVR \times FOVR \quad \text{(Expression 9)}$$

$$SOVRa=FSOVR \times SOVR \quad \text{(Expression 10)}$$

When the override multiplication is invalid, the override values FFOVR/FSOVR read from the instruction data area 110 in the memory 107 are used as override values to be applied as shown in the expression 11 and the expression 12 (step S113).

$$FOVRa=FFOVR \quad \text{(Expression 11)}$$

$$SOVRa=FSOVR \quad \text{(Expression 12)}$$

The speed override value FOVRa of the servo axis and the speed override value SOVRa of the main axis in the execution mode are determined in the above manner.

In this embodiment, the tool number, the servo-axis feed-speed instruction value, and the main-axis rotation-number instruction value specified with respect to each block of the machining program are used as check conditions. These check conditions are irrelevant to the machining program number and the block number (at step S104 in FIG. 2). In this embodiment, when a matching machining condition is not found and the mode becomes the storage mode as a result of checking the machining conditions, it is checked whether a storage instruction has been input through the storage-instruction input unit 105. When a storage instruction has been input, a machining condition is stored (at step S106 in FIG. 2). However, it is not always necessary to switch selection between storing and not storing of the machining condition by the storage-instruction input unit 105, and this switching can be skipped depending on a using mode of a processing machine. In other words, a machining condition can be automatically stored in the storage mode.

As described above, in the numerical control apparatus according to this embodiment, the memory (storage device) 107 stores therein machining condition storage instructions including a tool number, a servo-axis feed-speed instruction value and a main-axis rotation-number instruction value specified by the machining program 103, and override values of the servo axis and the main axis specified through the override switch. The machining-condition checking unit (machining-condition monitoring unit) 114 monitors whether there a matching combination of the machining conditions such as the tool number, the feed speed, and the main-axis rotation number specified in the machining block. The interpolation processor (controller) 115 multiplies the override values stored in the memory 107 by the servo-axis feed-speed instruction value and the main-axis rotation-number instruction value to be executed based on a result of check by the machining-condition checking unit 114 after the execution of the machining condition storage instruction.

When the machining-condition checking unit 114 determines there is a matching combination of the machining conditions, based on an override multiplication valid/invalid signal set in advance, the interpolation processor 115 as a controller controls the speed of the servo axis and the main axis with the feed speed and the number of main-axis rotations multiplied by the current override value and the speed override value corresponding to the machining conditions when the override multiplication is valid. When the override multiplication is invalid, control is performed with the feed speed and the number of main-axis rotations multiplied only by the speed override value corresponding to the machining conditions. The machining conditions irrelevant to the machining program number and the block number are stored together with the corresponding override values and the machining conditions are checked, and the override values of the servo axis and the main axis are controlled. Thus, the servo-axis feed-speed instruction value and the main-axis rotation-number instruction value of another machining program within one machining program group or another machining block within the same machining program can be controlled easily, which reduces the labor of an override operation by an operator.

The numerical control apparatus according to this embodiment further includes the machining condition changer 111 that displays on the display device 112 a machining condition corresponding to the tool number stored in the memory 107, and that can edit the machining condition stored in the memory 107 through the machining-condition changing unit 113 after executing the machining condition storage instruction. Therefore, the operator can change or add a machining condition and a speed override value stored in the memory 107 as required.

Second Embodiment

To decrease the load of an operator when a machining condition is very large, a numerical control apparatus according to this embodiment stores therein a main-axis load current during machining as a reference main-axis load current in response to a storage instruction, and in the subsequent machining, automatically adjusts an override value of a servo axis to correspond to the stored reference main-axis load current.

Figure 3:
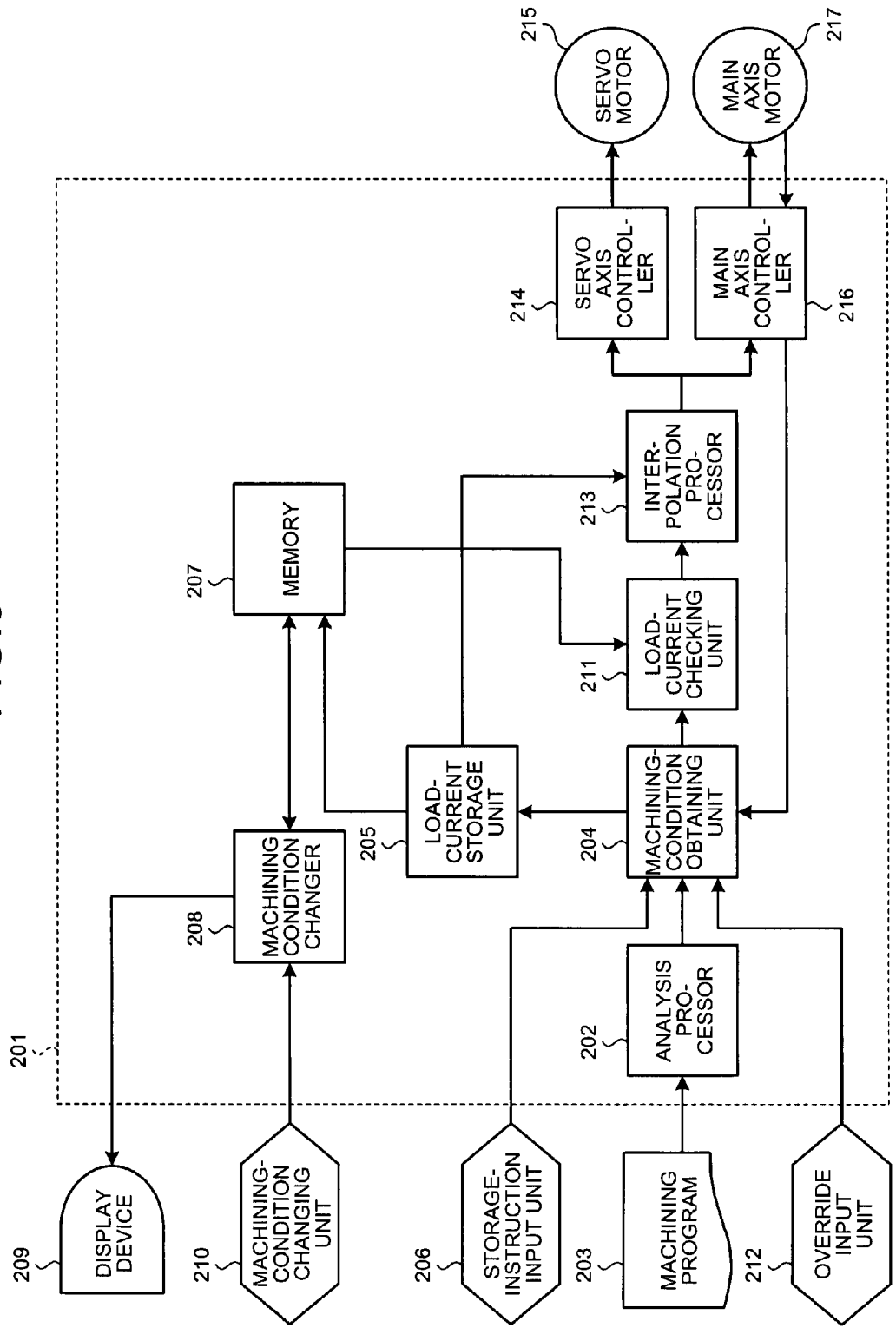
FIG. 3 is a block diagram of a numerical control apparatus according to a second embodiment of the present invention.

FIG. 3 is a block diagram of the numerical control apparatus according to the second embodiment of the present invention. In FIG. 3, a numerical control apparatus 201 includes an analysis processor 202, a machining-condition obtaining unit 204, a memory 207 as a storage device, a machining condition changer 208, a load-current checking unit 211, an interpolation processor 213 as a controller, a servo axis controller 214, and a main axis controller 216.

The analysis processor 202 reads each machining block of a machining program 203 input from the outside. The machining-condition obtaining unit 204 reads, from each machining block of the machining program, a machining condition, a main-axis load current value and a main-axis instruction rotation number reaching signal during machining. A load-current storage unit 205 stores the main load current in the memory 207 as a reference main-axis load current when a storage-instruction input unit 206 determines the mode as the storage mode.

The machining condition changer 208 displays, on a display device 209, the reference main-axis load current stored in the memory 207, and enables changes in the reference main-axis load current with data input through a machining-condition changing unit 210.

The load-current checking unit 211 compares the size of the current main-axis load current with that of the reference main-axis load current, and adjusts the speed override value of the servo axis specified by an override input unit 212. The interpolation processor 213 determines a servo-axis moving instruction based on the adjusted override value. The servo axis controller 214 outputs driving power corresponding to the moving instruction to a servo motor 215. The main axis controller 216 outputs driving power corresponding to the main-axis rotation number instruction to a main axis motor 217, and reads the current main-axis load current value.

Figure 4:
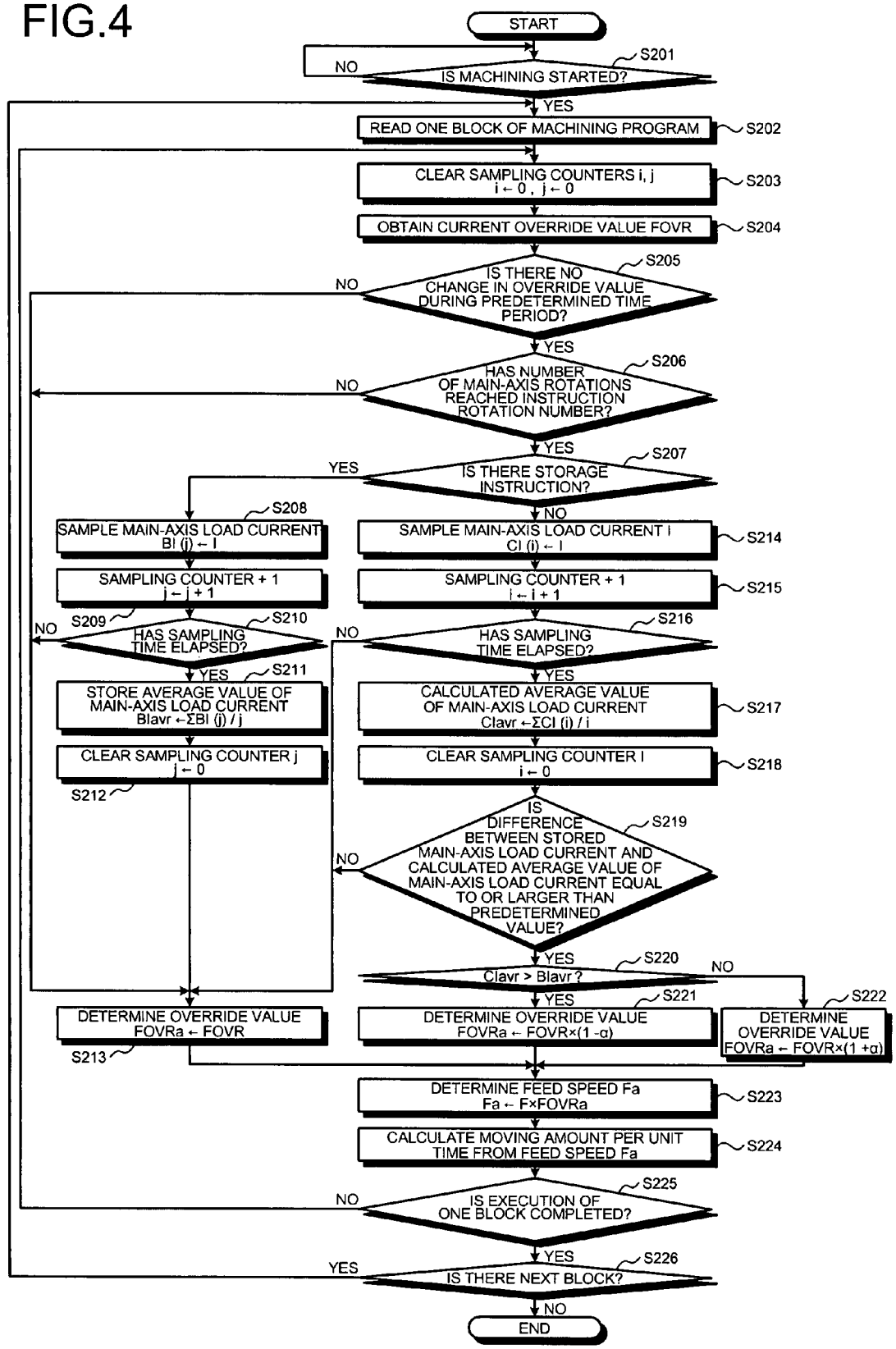
FIG. 4 is a flowchart of a process procedure performed by the numerical control apparatus according to the second embodiment of the present invention.

FIG. 4 is a flowchart of a process procedure performed by the numerical control apparatus 201 according to this embodiment. The process procedure is explained in detail below with reference to FIG. 4. When the machining is started, the analysis processor 202 reads each machining block of the machining program (step S202), and repeats the process at step S203 to step S225 until the execution of the machining block is completed. First, the current override value FOVR of the servo axis set through the override input unit 212 is obtained (step S204). When the override value does not change during a predetermined time period (step S205), and the number of main-axis rotations reaches the instruction rotation number (step S206), it is checked whether an instruction is input through the storage-instruction input unit 206 as the G instruction or the PLC signal in the machining program. It is confirmed whether the storage mode or the execution mode is instructed to perform switching between the storage mode and the execution mode (step S207).

In the storage mode, the process at step S208 to step S213 is performed. In the execution mode, the process at step S214 to step S222 is performed. In both the modes, the speed override value of the servo axis FOVRa to be applied by this process is determined. After the speed override value FOVRa is determined, the feed speed instruction value F of the servo axis specified by the machining program is multiplied by this override value, and a feed speed Fa of the servo axis is determined by the expression 13 (step S223).

$$Fa = F \times FOVRa \quad \text{(Expression 13)}$$

Fa: Feed speed after adjustment

F: Feed speed instruction value specified by machining program

Lastly, a servo-axis moving amount per unit time is calculated from the feed speed Fa, and the servo axis controller 214 drives the servo motor 215 based on this moving amount (step S224).

A method and a process procedure of determining the speed override value FOVRa of the servo axis in the storage mode (the process at step S208 to step S213) are explained in detail below.

When an instruction input through the storage-instruction input unit 206 as the G instruction or the PLC signal of the machining program is determined to instruct the storage mode, a main-axis load current I in current machining is sampled (step S208), and a sampling counter j is counted up (step S209).

$$BI(j) = I \quad \text{(Expression 14)}$$

BI(j): Sampling current main-axis load current j: Sampling counter

The main-axis load current is sampled during a predetermined time period (step S210). After the main-axis load current has been sampled during a predetermined time period, an average value of the sampled main-axis load current is calculated by the expression 15, and the average value is stored in the memory 207 as a reference main-axis load current (step S211).

$$BIavr = \Sigma BI(j)/j \quad \text{(Expression 15)}$$

BIavr: Average value of sampled main-axis load current=reference main-axis load current In this case, when the reference main-axis load current has already been stored, this value is overwritten. The sampling counter j is then cleared to 0 (step S212).

Thereafter, the speed override value of the servo axis specified by the machining program is directly used as shown in the expression 16 (step S213).

$$FOVRa = FOVR \quad \text{(Expression 16)}$$

A method and a process procedure of determining the speed override value FOVRa of the servo axis in the execution mode (process at step S214 to step S222) are explained in detail below.

When an instruction input through the storage-instruction input unit 206 as the G instruction or the PLC signal of the machining program is determined to instruct the execution mode, the main-axis load current I in current machining is sampled (step S214), and a sampling counter j is counted up (step S215).

$$CI(i) = I \quad \text{(Expression 17)}$$

CI(i): Sampling current main-axis load current i: Sampling counter

The main-axis load current is sampled during a predetermined time period (step S216). After the main-axis load current is sampled during the predetermined time period, the sampled main-axis load current is averaged. (step S217).

$$CIavr = \Sigma CI(i)/i \quad \text{(Expression 18)}$$

CIavr: Average value of sampled main-axis load current

The sampling counter i is then cleared to 0 (step S218). The size of the reference main-axis load current BIavr stored in the memory 207 is compared with that of the calculated average value CIavr of the main-axis load current (step S219). When a difference between both the main-axis load currents is within a predetermined value set in advance, the override value specified during the execution of the machining program is set as an override value to be applied (step S213).

On the other hand, when a difference between both the main-axis load currents is equal to or larger than the predetermined value and the reference main-axis load current BIavr is larger than the average value CIavr of the main-axis load current, an override value obtained by decreasing the override value by an override change rate α set in advance is used as the override value FOVRa to be applied as shown in the expression 19 (step S221).

$$FOVRa = FOVR \times (1-\alpha) \quad \text{(Expression 19)}$$

When the reference main-axis load current BIavr is smaller than the above average value CIavr of the main-axis load current, an override value obtained by increasing the override value by the override change rate α is used as the override value FOVRa to be applied as shown in the expression 20 (step S222).

$$FOVRa = FOVR \times (1+\alpha) \quad \text{(Expression 20)}$$

The speed override value FOVRa of the servo axis in the execution mode is determined in the above manner. When the process at step S203 to step S224 is repeated in this way, the average value Clavr of the main-axis load current can be coincided with the reference main-axis load current Blavr.

As described above, in the numerical control apparatus according to this embodiment, the memory 207 (storage device) stores therein the main-axis load current during machining when there is a storage instruction in response to an instruction through the storage-instruction input unit 206. The load-current checking unit 211 compares the main-axis load current specified at present with the main-axis load current stored in the storage device. The interpolation processor 213 (controller) decreases the override value of the servo axis by a preset change rate when the main-axis load current specified at present is larger than the main-axis load current stored in the memory 207 based on a result of the check performed by the load-current checking unit 211, and increases the override value of the servo axis by the preset change rate when the main-axis load current specified at present is smaller than the main-axis load current stored in the memory 207. Thus, the interpolation processor 213 controls the main-axis load current specified at present to coincide with the stored main-axis load current. The load-current checking unit 211 sets the main-axis load current during machining as a checking condition. Because this condition is irrelevant to the machining program number and the block number, the feed speed of the servo axis of another block within the same machining program or another machining program can be controlled.

INDUSTRIAL APPLICABILITY

A numerical control apparatus according to the present invention is suitably applied to the case where a machining program takes a long time to perform machining operations and a used tool is changed frequently.

The invention claimed is:

1. A numerical control apparatus that performs machining of a workpiece according to a machining program including a machining block and variably controls speed of a servo axis and a main axis based on an override value specified through an override switch, the numerical control apparatus comprising:

a storing unit that stores, in a storage device, machining conditions including at least a tool number, a servo-axis feed speed, and number of main-axis rotations specified in the machining program, and an override value of the servo axis and an override value of the main axis specified through the override switch in association with the machining conditions;

a monitoring unit that monitors whether a combination of machining conditions that matches machining conditions specified in the machining block to be executed is present in the storage device; and a control unit that, when a combination of machining conditions that matches the machining conditions specified is present, controls the speed of the servo axis and the main axis with servo-axis feed speed and number of main-axis rotations specified in the machining block each multiplied by a corresponding override value stored in the storage device.

2. The numerical control apparatus according to claim 1, further comprising a condition changing unit that displays, on a display device, machining conditions corresponding to the tool number stored in the storage device, and allows edit of the machining conditions stored in the storage device through an input unit.

3. The numerical control apparatus according to claim 1, wherein the storing unit stores, in the storage device, the machining conditions and the override values when there is no change in the override values for a predetermined time period.

4. The numerical control apparatus according to claim 1, wherein the storing unit stores, in the storage device, the machining conditions and the override values in response to an instruction.

5. The numerical control apparatus according to claim 4, wherein the instruction is a numerical control command in the machining program.

6. The numerical control apparatus according to claim 4, wherein the instruction is a signal output from any one of an internal programmable logic controller and an external programmable logic controller.

7. The numerical control apparatus according to claim 1, wherein the storing unit stores a table in which at least some of the machining conditions are each stored with a corresponding override value of the servo axis and a corresponding override value of the main axis.

8. The numerical control apparatus according to claim 1, wherein the monitoring unit checks current tool number, current servo-axis feed-speed instruction value, and current main-axis rotation-number instruction value specified with respect to each block of the machining program with the stored tool number, the servo-axis feed-speed instruction value, and the main-axis rotation-number instruction value and if a match is not found, the numeric control apparatus executes a storage mode and if the match is found, the numeric control apparatus continues executing in an execution mode and loads a corresponding override value of the servo axis and a corresponding override value of the main axis from the storage unit.

9. A numerical control apparatus that performs machining of a workpiece according to a machining program including a machining block and variably controls speed of a servo axis and a main axis based on an override value specified through an override switch, the numerical control apparatus comprising:

a storing unit that stores, in a storage device, machining conditions including at least a tool number, a servo-axis feed speed, and a number of main-axis rotations specified in the machining program, and an override value of the servo axis and an override value of the main axis specified through the override switch in association with the machining conditions;

a monitoring unit that monitors whether a combination of machining conditions that matches machining conditions specified in the machining block to be executed is present in the storage device; and a control unit that, when a combination of machining conditions that matches the machining conditions specified is present, determines whether override multiplication is permitted based on a preset signal, and controls the speed of the servo axis and the main axis with feed speed and number of main-axis rotations each multiplied by a corresponding override value and a current override value when override multiplication is permitted, and controls the speed of the servo axis and the main axis with feed speed and number of main-axis rotations each multiplied by a corresponding override value when override multiplication is not permitted.

10. The numerical control apparatus according to claim 9, further comprising a condition changing unit that displays, on a display device, machining conditions corresponding to the tool number stored in the storage device, and allows edit of the machining conditions stored in the storage device through an input unit.

11. The numerical control apparatus according to claim 9, wherein the storing unit stores, in the storage device, the machining conditions and the override values when there is no change in the override values for a predetermined time period.

12. The numerical control apparatus according to claim 9, wherein the storing unit stores, in the storage device, the machining conditions and the override values in response to an instruction.

13. The numerical control apparatus according to claim 12, wherein the instruction is a numerical control command in the machining program.

14. The numerical control apparatus according to claim 12, wherein the instruction is a signal output from any one of an internal programmable logic controller and an external programmable logic controller.

15. A numerical control apparatus that performs machining of a workpiece according to a machining program and variably controls speed of a servo axis and a main axis based on an override value specified through an override switch, the numerical control apparatus comprising:

a storing unit that stores main-axis load current during machining in a storage device;

a comparing unit that compares currently specified main-axis load current with stored main-axis load current; and a control unit that, based on a comparison result obtained by the comparing unit, decreases an override value of the servo axis at a preset rate when the currently specified main-axis load current is larger than the stored main-axis load current, and increases the override value of the servo axis at the preset rate when the currently specified main-axis load current is smaller than the stored main-axis load current, so that the currently specified main-axis load current is coincide with the stored main-axis load current.

16. The numerical control apparatus according to claim 15, further comprising a condition changing unit that displays, on a display device, the stored main-axis load current, and allows edit of the stored main-axis load current through an input unit.

17. The numerical control apparatus according to claim 15, wherein the storing unit stores the main-axis load current in the storage device when there is no change in the override value for a predetermined time period and number of main-axis rotations has reached a specified number.

18. The numerical control apparatus according to claim 15, wherein the storing unit stores the main-axis load current in the storage device in response to an instruction.

* * * * *